United States Patent [19]

McCoy

[11] 4,402,363
[45] Sep. 6, 1983

[54] DEMULSIFICATION OF BITUMEN EMULSIONS USING SALTS OF POLY(TERTIARY AMINO)POLYURETHANES

[75] Inventor: David R. McCoy, Austin, Tex.

[73] Assignee: Texaco Inc., White Plains, N.Y.

[21] Appl. No.: 326,465

[22] Filed: Dec. 2, 1981

[51] Int. Cl.$^3$ .................. E21B 43/24; E21B 43/40
[52] U.S. Cl. .................................. 166/267; 166/303;
   208/188; 210/708; 252/344
[58] Field of Search ............ 252/331, 341, 344, 358;
   208/188, 11 LE, 11 R; 210/708; 166/266, 267,
   272, 303

[56] References Cited

U.S. PATENT DOCUMENTS

| | | | |
|---|---|---|---|
| 2,288,857 | 7/1942 | Subkow | 166/267 X |
| 3,108,059 | 10/1963 | Greenwald | 210/708 X |
| 3,267,998 | 8/1966 | Simpson | 166/266 |
| 3,594,393 | 7/1971 | Buriks et al. | 252/331 X |
| 4,101,172 | 7/1978 | Rabbitts | 166/272 X |
| 4,321,148 | 3/1982 | McCoy et al. | 252/341 |

*Primary Examiner*—Stephen J. Novosad
*Assistant Examiner*—George A. Suchfield
*Attorney, Agent, or Firm*—Jack H. Park; Kenneth R. Priem; David L. Mossman

[57] ABSTRACT

A process for recovering bitumen from oil-in-water (O/W) emulsions is disclosed wherein water soluble demulsifiers are used. These demulsifiers are salts of poly(tertiary amino)polyurethanes prepared by the reaction of polyisocyanates with diols containing at least one tertiary amino group which reaction product is then reduced in pH until water solubility is attained. To resolve the bituminous petroleum emulsions, the process is carried out between 25° and 160° C. wherein the demulsifier of the invention is contacted with the bituminous emulsion.

5 Claims, No Drawings

4,402,363

DEMULSIFICATION OF BITUMEN EMULSIONS USING SALTS OF POLY(TERTIARY AMINO)POLYURETHANES

BACKGROUND OF THE INVENTION

1. Field of the Invention

This invention is concerned with the breaking or resolution of oil-in-water (O/W) bituminous emulsions by treatment with salts of poly(tertiary amino)polyurethanes.

2. Description of the Related Art

A great volume of hydrocarbons exist in known deposits of tar sands. These deposits occur at various places, the Athabasca tar sands in Canada being an example. The petroleum in a tar sand deposit is an asphaltic bitumen of a highly viscous nature ranging from a liquid to a semisolid. These bituminous hydrocarbons are usually characterized by being very viscous or even non-flowable under reservoir conditions by the application of driving fluid pressure.

Where surface mining is not feasible, the bitumen must be recovered by rendering the tar material mobile in-situ and producing it through a well penetrating the tar sand deposit. These in-situ methods of recovery include thermal, both steam and in-situ combustion and solvent techniques. Where steam or hot water methods are used, a problem results which aggravates the recovery of the bitumen. The difficulty encountered is emulsions produced by the in-situ operations. These emulsions are highly stable O/W emulsions which are made even more stable by the usual presence of clays. Most liquid petroleum emulsions are water-in-oil (W/O) types. These normal W/O emulsions are broken by methods known in the art. However, the bitumen emulsions which are O/W types present a much different problem, and the same demulsifiers used in W/O emulsions will not resolve the O/W bitumen emulsions.

Ser. No. 152,453 filed 5/22/80, now U.S. Pat. No. 4,321,148, claims the use of polyurethanes as demulsifiers.

Application Ser. No. 326,456 filed of even date, claims the water soluble salts of polyoxyalkylene polyamines as bitumen demulsifiers.

Application Ser. No. 326,461 filed of even date, claims the water soluble salts of certain cationic polymers as bitumen demulsifiers.

SUMMARY OF THE INVENTION

The invention is a method for recovering petroleum from O/W bitumen emulsions by resolving or breaking (demulsifying) these emulsions by contacting the emulsions at a temperature of from between about 25° and 160° C. with water soluble salts prepared by adding inorganic or organic acids to polyurethanes of greater than about 5,000 molecular weight prepared by the reaction of polyisocyanates with diols containing at least one tertiary amino group.

DESCRIPTION OF THE PREFERRED EMBODIMENTS

The process of this invention utilizing the chemical demulsifier as described above utilizes as a chemical demulsifier a particular water soluble salt of a poly(tertiary amino)polyurethane.

The particular demulsifiers useful in this invention are water soluble salts prepared by adding to polyurethanes of greater or equal to 5,000 molecular weight prepared by reaction under appropriate conditions of temperature and catalysis of polyisocyanates, preferably diisocyanates such as toluene diisocyanate or MDI, of molecular weight under about 500 with diols containing at least one tertiary amino group, inorganic or organic acid to render a 1 wt. % aqueous solution, pH<8 and pH>1 prior to addition of the demulsifier to the bitumen emulsion.

Examples of diol containing at least one tertiary amino group are bis(hydroxyethyl)piperazine, N-methyl diethanolamine, ethyldiethanolamine, diethoxylated or propoxylated alkoxy polyalkoxy amines, di(hydroxyalkyl) pyridines, di(hydroxyethyl) dimethylaminopropylamine, etc.

The acids useful in this invention are mono-, di- or polybasic and can be inorganic mineral acid such as HCl, $H_2SO_4$, $H_3PO_4$ or acidic salts such as $NaHSO_4$, $Na_2HPO_4$, and similar compounds or low molecular weight carboxylic acids such as acetic acid.

An additional embodiment of this invention is the use of the water phase of the broken bitumen emulsions in subsequent bitumen recovery operations. The water phase of the broken bitumen emulsions contains the demulsifying water soluble salts described above. The bitumen is usually recovered by hot water and/or steam which emulsifies the oil in situ and makes it more mobile for production. Therefore, the aqueous phase of the broken bitumen emulsion containing a demulsifier may not be used without further treatment for production of additional bitumen. Therefore, this invention also includes the step of raising the pH of the aqueous phase of the broken bitumen emulsions to greater than about 8 so that the demulsifying salts mentioned above are rendered ineffective as demulsifiers and the aqueous may then be reinjected into the bitumen formation to emulsify further bitumen.

Therefore, an embodiment of this invention is a process for recovering bitumen from a tar sand formation comprising injecting into a tar sand a fluid containing hot water and/or steam in order to emulsify the bitumen in the tar sand and then recovering the emulsified bitumen. This bitumen emulsion is then demulsified by adding thereto water soluble salts of the polyurethanes as described herein. The aqueous phase of the broken bitumen emulsion is then converted into inactive polymers by pH adjustment and is reinjected into a bitumen containing formation to recover additional bitumen.

The produced bitumen emulsions may be treated by the process of our invention in a conventional manner, for example, in a conventional horizontal treater operated, for example, from about 25° to 160° C. and, preferably, from about 50°–150° C. at autogenous pressures. The concentration of the chemical demulsifier described above used in treating the bitumen in water emulsions may range from about 1 to 200 parts per million and, preferably, from about 10 to 120 parts per million with the optional addition of an organic diluent and/or inorganic salt as well as standard flocculants and mechanical or electrical means of demulsification. The following examples describe more fully the present process. However, these examples are given for illustration and are not intended to limit the invention.

EXAMPLE I

PREPARATION OF POLYURETHANES FROM POLYETHOXYLATED JEFFAMINE ® M-300

(a) A one-liter resin flask was charged with 200 g of the 30 molar ethoxylate of JEFFAMINE M-300

$$[CH_3(CH_2)_{9-11}OCH_2\underset{\underset{CH_3}{|}}{C}HOCH_2\underset{\underset{CH_3}{|}}{C}HNH_2]$$

which was stripped at 100° C. for ½ at 0.4 mm pressure to remove traces of moisture present. Contents of the flask were cooled to 80° C. and the following were charged: 200 g toluene (previously dried over 3A molecular sieves), 0.2 g 2,6-di-t-butyl-p-cresol, and 0.08 g dibutyltin dilaurate. Toluene diisocyanate (16 ml, 0.9 mole) was added over a six minute period at 50° C. and the mixture was stirred under nitrogen for 1 hour at 50° C. followed by 2 hours at 100° C. Solvent was removed under vacuum to obtain a product having a molecular weight (basis hydroxyl number) of 10,000.

(b) Procedure Ia above was repeated with the following variations: starting material was neutralized to ~pH 8 with concentrated hydrochloric acid prior to TDI addition, 300 g toluene solvent was employed, and 0.95 moles (16.9) TDI were added. The stripped product has an average molecular weight of 12,400 basis liquid chromatography.

EXAMPLE II

PREPARATION OF POLYURETHANE FROM N-METHYLDIETHANOLAMINE

A one-liter resin flask was charged with 75 g of N-methyldiethanolamine (previously dried over 3A molecular sieves) and 250 g dry tetrahydrofuran. Also charged were 0.2 g of 2,6-di-t-butyl-p-cresol and 0.08 g dibutyltin dilaurate. Contents were heated to reflux under nitrogen atmosphere with mechanical stirring and then charged over a 45 minute period with 85.4 ml (0.95 mole) toluene diisocyanate followed by a 3 hour reflux period. Solvent was removed to leave a white solid product having a molecular weight by gel permeation chromatography of 6,900.

EXAMPLE III

BOTTLE EMULSION TESTS

The following basic testing procedure was employed:
(a) A 1 wt. % solution (on an amine charged basis where aminopolymers were used, rather than on an amines salts basis) of each chemical was prepared (in water, toluene or tetrahydrofuran).
(b) A 30 ml PYREX ® test tube equipped with screw top was charged with 23 ml emulsion of 11.5 wt. % bitumen content obtained by in-situ steam flooding in tar sand pattern located at Ft. McMurray, Alberta, Canada.
(c) 2 ml of Wizard Lake Crude Oil was added as diluent and the contents of the test tube were mixed.
(d) The contents of the test tube were equilibrated in an 80° C. oven for 1-2 hours and mixed again.
(e) Chemical was added to the hot, dilute emulsion at the following concentrations: 30, 60, 120 ppm.
(f) Contents of the test tubes were mixed, re-equilibrated in an oven at 80° C. for 1 hour and mixed again.
(g) After 20 hours of standing at 80° C., measurements were made on the volume of top and middle layers, and the appearance of the aqueous phase was noted. Samples of some top layers were carefully removed by pipetting and subjected to Karl-Fischer analysis for determination of the water content. pH measurements were made on the aqueous phases of some broken emulsions to confirm that the addition of even highly acidic demulsifier solutions in the small quantities used have little effect on lowering the pH from the initially observed emulsion pH of 7.8.

Results are shown in the table on the following page. Comparative examples are given to show the relative ineffectiveness of neutral polyaminopolyurethanes (IIIn and IIIo). A known demulsifier, POLYOX ® WSR-301, is also included for comparison purposes.

The effectiveness of salts of Example Ia-b products show that higher charge density is not of importance as with other polyamine salt demulsifiers.

The effectiveness of salts of Example II, on the other hand, show that high polymer molecular weight is not necessary such as with polyurethanes.

| | | | DEMULSIFIER TESTING | | |
|---|---|---|---|---|---|
| Example III | Candidate Demulsifier (pH of 1% aq. soln)* | Concentration (ppm) | Oil Phase Volume in ml. (% H$_2$O) | Emulsion Phase Volume in ml. (% H$_2$O) | Aqueous Phase Appearance |
| a | Product of Ex. Ia(6.3) | 60 | 5.75 (21) | 0 | Muddy with solids |
| b | Product of Ex. Ia(6.3) | 120 | 5.5 (36) | 0 | Muddy |
| c | Product of Ex. Ib(3.1) | 60 | 6.25 (9) | 0.25 | Muddy |
| d | Product of Ex. Ib(3.1) | 120 | 4 | 2 | Muddy |
| e | Product of Ex. Ib(3.1) | 30 | 5 (40) | 0 | Muddy |
| f | POLYOX WSR-301 | 30 | 7 | 2.5 | Muddy |
| g | POLYOX WSR-301 | 60 | 7.75 (68) | 0.25 | Yellow, translucent |
| h | POLYOX WSR-301 | 120 | 8 (97) | 1.25 | Brown, translucent |
| i | None | — | 3 | 3.5 | Muddy |
| j | Product of Ex. II(1.8) | 120 | 6.75 (22) | 0 | Light, muddy |
| k | Product of Ex. II(5) | 120 | 7.75 (11.5) | 0 | Light, muddy |
| l | POLYOX WSR-301 | 120 | 7.25 (40) | 1.25 | Dark, translucent |
| m | None | — | 2.5 | 2 | Muddy |
| n | Product of Ex. Ia | 60 | 2.5 | 1.75 | Muddy with solids |
| o | Product of Ex. II | 120 | 1.75 | 3.5 | Muddy |
| p | None | — | 3 | 3 | Muddy |

*Concentrated hydrochloric acid used to neutralize the polyaminopolyurethanes in cases where pH is listed

We claim:

1. A process for recovering petroleum from O/W bitumen emulsions by demulsifying said emulsions comprising contacting the emulsions at a temperature of from between about 25° and 160° C. with water soluble salts prepared by adding inorganic or organic acids to polyurethanes of greater than about 5,000 molecular weight wherein the polyurethanes are prepared by the reaction of polyisocyanates with diols containing at least one tertiary amino group.

2. A process as in claim 1 wherein the diol is bis(N-hydroxyethyl)piperazine.

3. A process as in claim 1 wherein the diol is N-methyldiethanolamine.

4. A process as in claim 1 wherein the polyisocyanate is toluene diisocyanate.

5. A process for recovering bitumen from a tar sand formation comprising injecting into the tar sand a fluid containing hot water and/or steam in order to emulsify the bitumen in the tar sand, recovering the emulsified bitumen, demulsifying said emulsions by contacting the emulsions at a temperature of between 25° and 160° C. with water soluble salts prepared by adding inorganic or organic acids to polyurethanes of greater than about 5,000 molecular weight wherein the polyurethanes are prepared by the reaction of polyisocyanates with diols containing at least one tertiary amino group, converting the salts of the polyurethanes into inactive polyurethanes by pH adjustment of the aqueous phase of the broken emulsion to >8, and reinjecting the aqueous phase into a bitumen containing formation to recover additional bitumen.

* * * * *